(12) United States Patent
Lauzet

(10) Patent No.: US 7,802,742 B2
(45) Date of Patent: Sep. 28, 2010

(54) MULTIPURPOSE CASSETTE FOR ADJUSTING A GRINDER ON A MECHANICAL OR ELECTRICAL CONDIMENT MILL OR ON A DEVICE FOR FINELY BREAKING FOODSTUFF

(75) Inventor: Maurice Lauzet, Chenecey Buillon (FR)

(73) Assignee: PSP Industries SAS, Quingey (FR)

( * ) Notice: Subject to any disclaimer, the term of this patent is extended or adjusted under 35 U.S.C. 154(b) by 676 days.

(21) Appl. No.: 11/658,303

(22) PCT Filed: Jun. 7, 2005

(86) PCT No.: PCT/FR2005/001387

§ 371 (c)(1), (2), (4) Date: Jan. 23, 2007

(87) PCT Pub. No.: WO2006/024709

PCT Pub. Date: Mar. 9, 2006

(65) Prior Publication Data

US 2009/0256016 A1 Oct. 15, 2009

(30) Foreign Application Priority Data

Jul. 28, 2004 (FR) .................................. 04 08309

(51) Int. Cl.
*A47J 42/02* (2006.01)
(52) U.S. Cl. .................................................. 241/169.1
(58) Field of Classification Search .............. 241/169.1, 241/169.2, 168, 286
See application file for complete search history.

(56) References Cited

U.S. PATENT DOCUMENTS

| 1,327,385 | A | 1/1920 | Hammer |
|---|---|---|---|
| 2,858,081 | A | 10/1958 | Sinkinson |
| 3,124,313 | A | 3/1964 | Kraus |
| 3,168,256 | A | 2/1965 | Bounds et al. |
| 4,343,437 | A | 8/1982 | Czelen |
| 4,685,627 | A | 8/1987 | Lee |
| 4,993,584 | A | 2/1991 | Macario |
| 5,651,506 | A | 7/1997 | Hockey |
| 5,785,264 | A | 7/1998 | Yang |
| 6,443,377 | B1 * | 9/2002 | Cheng ..................... 241/169.1 |
| 6,491,244 | B2 | 12/2002 | Pedersen |
| 6,616,075 | B1 | 9/2003 | Millerd |
| 7,048,216 | B2 | 5/2006 | Ng |
| 2002/0038832 | A1 | 4/2002 | Chen |
| 2002/0117566 | A1 | 8/2002 | Cheng |
| 2002/0117567 | A1 | 8/2002 | Lee et al. |
| 2002/0145065 | A1 | 10/2002 | McCowin |
| 2004/0124294 | A1 | 7/2004 | Ng |
| 2004/0164193 | A1 | 8/2004 | Yang |
| 2008/0315022 | A1 | 12/2008 | Wilson et al. |

FOREIGN PATENT DOCUMENTS

| BE | 469899 | 6/1947 |
|---|---|---|
| CH | 351726 | 1/1961 |

(Continued)

*Primary Examiner*—Mark Rosenbaum
(74) *Attorney, Agent, or Firm*—Gary M. Cohen

(57) ABSTRACT

A device for adjusting a condiment grinder or a foodstuff breaking unit includes a cassette having an adjusting ring (3), a dish-supporting slide (2) and a fixing washer (1).

16 Claims, 1 Drawing Sheet

FOREIGN PATENT DOCUMENTS

| | | |
|---|---|---|
| DE | 2922656 | 12/1980 |
| DE | 8531554 | 12/1985 |
| DE | 3632688 | 2/1993 |
| DE | 19514794 | 10/1996 |
| DE | 20000353 | 5/2000 |
| EP | 0281714 | 9/1988 |
| FR | 2159828 | 6/1973 |
| FR | 2852505 | 9/2004 |
| FR | 2857841 | 1/2005 |
| FR | 2857842 | 1/2005 |
| FR | 2865368 | 7/2005 |
| GB | 1429310 | 3/1976 |
| WO | WO 0028870 | 5/2000 |

\* cited by examiner

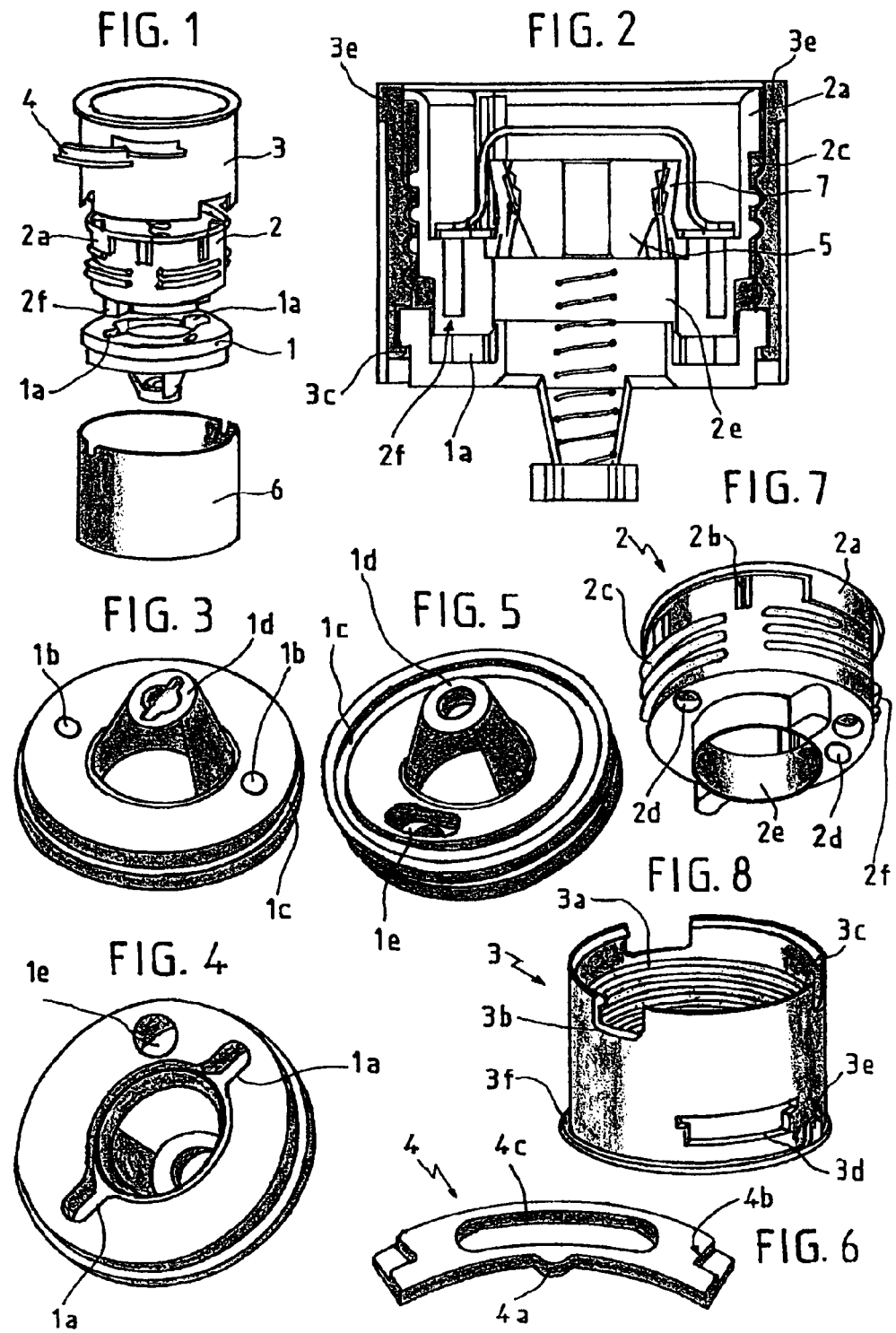

MULTIPURPOSE CASSETTE FOR ADJUSTING A GRINDER ON A MECHANICAL OR ELECTRICAL CONDIMENT MILL OR ON A DEVICE FOR FINELY BREAKING FOODSTUFF

BACKGROUND OF THE INVENTION

The present invention relates to an independent universal cassette for adjusting the degree of fineness of grinding in a condiment mill or a device for breaking up foodstuff.

A nut is generally used to adjust how finely a condiment, such as pepper, is ground, or how a foodstuff is broken up into powder, flakes or shavings. This nut is mounted on an operating shaft and is screwed and unscrewed to adjust how finely a foodstuff is broken up or ground. This type of device has the major disadvantage that the setting tends to slip and requires frequent re-adjustment.

However, the grinding adjustment device described in French Patent Application No. 04 02299, which is commonly owned by the applicant, describes a grinding device in which the rotation of the operating ring drives a dish-holder in translation. The described device makes it possible to vary the relative position between the grinding block and the dish, thereby grinding the condiment. Such a system has the particular advantage of not requiring re-adjustment.

Furthermore, the adaptation of a more elaborate system has the disadvantage of requiring an arrangement of the system for each type of mill. However, the shapes and sizes of the bodies of mills vary widely, making it very expensive to adapt the grinding adjustment system to each type of mill.

SUMMARY OF THE INVENTION

In accordance with the present invention, the various drawbacks mentioned above are overcome using a universal adjustment device which is placed at the base of the mill and which is suitable for use with many mill bodies, simply by the adaptation of a decorative ferrule.

To this end, the present invention relates to a universal device for adjusting the grinding of a condiment or the breaking up of foodstuff which includes a cassette formed of an adjustment ring, a dish-holder slide and a fixing disk.

The description which follows relates, in particular, to a mechanical pepper mill. However, the universal cassette device of the present invention can be used with all types of assemblies used to break up foodstuffs into powder or flakes, such as grinders, graters or knives by way of non-limiting example, as well as electrical apparatus such as electric pepper mills, for example.

Mills designed especially for condiments, such as pepper, are generally comprised of various parts, in particular, a container for holding the condiments and a grinding mechanism. The grinding mechanism has a disk attached to the body of the mill. A dish-holder slide is mounted on the disk, and is embedded in an operating ring for adjusting the degree of grinding. The actual grinding mechanism includes a female part, hereinafter called a "dish", which fits within a male part, hereinafter called a "grinding block", and the grinding mechanism is placed in the dish-holder slide.

A better understanding of the apparatus of the present invention is provided in the detailed description which is provided below, with reference to the following drawings.

BRIEF DESCRIPTION OF THE DRAWINGS

FIG. 1 is an exploded view showing the parts of the mill, before insertion.

FIG. 2 is a cross-sectional view showing an example of how the various parts of the mill can be assembled together.

FIG. 3 is a detailed view of the underside of the fixing disk in a mechanical mill.

FIG. 4 is a detailed view of the top face of the fixing disk in an electric mill.

FIG. 5 is a detailed view of the underside of the fixing disk in an electric mill.

FIG. 6 is a detailed view of the movable stop.

FIG. 7 is a detailed view of the dish-holder slide.

FIG. 8 is a detailed view of the operating ring.

DETAILED DESCRIPTION OF PREFERRED EMBODIMENTS

In accordance with the present invention, a fixing disk 1 is used to attach a universal cassette to any mill body. The disk 1 is definitively attached to the body of the mill (not shown), and has two housings 1a on the top face of the disk 1. The housings 1a are provided to prevent a cooperating part 2 from rotating.

The fixing disk 1 has two threaded holes 1b for the insertion of screws, for attaching the universal cassette. The underside of the disk 1 has a collar 1c, for receiving an operating ring 3 of a grinding adjustment system. The underside of the fixing disk 1 also has a bridge 1d, in the center of the disk 1, for connection to the operating shaft of a grinding block 5. A hinge joint can be created by providing the bridge 1d with a retention device on either side, such as the non-limiting example of a retention ring. Such a connection system keeps the grinding block 5 in a fixed position.

The mill also includes a part 2 which is herein referred to as a "dish-holder slide". The dish-holder slide 2 has a dish 7 and includes the grinding block 5 at its center. Relative movement between the dish 7 and the grinding block 5 grinds the condiment.

The dish-holder slide 2 has a stop 2a on its outer upper part for limiting the movement of the operating ring 3. Also provided on the outer upper part of the dish-holder slide 2, at the same level as the stop 2a, are notches 2b for performing an indexing function. This makes it possible to adjust how finely a condiment is ground.

A screw thread 2c is also provided on the outer face of the dish-holder slide 2, underneath the fixed stop 2a and the notches 2b, for attaching the dish-holder slide 2 to the operating ring 3. The screw thread 2c is interrupted at certain points to prevent the accumulation of dust. The underside of the dish-holder slide 2 has two housings 2d, for attaching the dish-holder slide 2 to the body of the mill using screws.

The center of the dish-holder slide 2 has a skirt 2e, which is inserted in the fixing disk 1 and which prevents any of the condiment from getting back into the mill. The skirt 2e has two bosses 2f on its outer face, which are inserted in the housings 1a of the fixing disk 1 to prevent any movement of the dish-holder slide 2 relative to the fixing disk 1.

The dish-holder slide 2 is screwed into the operating ring 3. The operating ring 3, which represents the top part of the mill, has an internal screw thread 3a. The internal screw thread 3a corresponds to the external screw thread 2c of the dish-holder slide 2 and allows the dish-holder slide 2 to be moved using the operating ring 3.

The underside of the operating ring 3 has three support surfaces 3b and three clips 3c for attaching the ring 3 to the fixing disk 1. The top face of the ring 3 has a housing 3d for the insertion of a movable stop 4. The top face of the ring 3 also has lugs 3e, making it possible to mechanically drive the ring 3 using a decorative part, such as the ferrule 6, which can be made of wood, metal or plastic.

The top face of the operating ring 3 has a collar 3f, constituting a plastic bearing surface that can come into contact with a table to prevent scratches if a metal decorative ferrule 6 is used. The collar 3f also conceals imperfections in cylindricity that can be encountered with steel or wooden decorative ferrules. The decorative ferrule 6 will be held in place both by the collar and by the mill body.

After the dish-holder slide 2 and the operating ring 3 have been assembled, the movable stop 4 is placed on the operating ring 3. The stop 4 bears on the fixed stop 2a of the dish-holder slide 2, ensuring adjustment in the maximum position. The movable stop 4 has an indexing finger 4a which is positioned in the notches 2b of the dish-holder slide 2. The finger 4a ensures adjustment of the fineness of the grinding resulting from sensitive pinpointing of the grinding position.

One of the ends of the movable stop 4 has a dovetail 4b, for keeping the stop 4 in place in its housing 3d without the risk of being ejected when the operating ring 3 is rotated. Moreover, the movable stop 4 has an opening 4c at its center, so as not to be too rigid, giving the indexing finger 4a some flexibility.

The assembly made up of the operating ring 3, the movable stop 4 and the dish-holder slide 2 is inserted over the fixing disk 1, and is clipped together. The bosses 2f and the skirt 2e of the dish-holder slide 2 are inserted in the housings 1a, which are provided for this purpose on the fixing disk 1. When the operating ring 3 is moved, the dish-holder slide 2 moves axially, changing the relative position of the dish 7 and the grinding block 5.

In the end position, the way in which the various parts of the mill are assembled establishes either steel-on-steel contact between the two parts, or a gap. In the case of pepper, the gap will be around three millimeters. The gap can vary depending on the type of condiment or foodstuff to be broken up into bits or flakes.

The universal cassette of the present invention is comprised of the assembly of the operating ring 3, with the indexing finger 4a, the dish-holder slide 2 and the fixing disk 1. This cassette receives the dish 7 and makes it possible to assemble and precisely position the operating shaft and the grinding block 5. The position of the dish 7 relative to the grinding block 5 is changed, and then remains axially fixed, in this way adjusting how finely the condiment is ground.

Rotating the operating ring 3 in either direction moves the dish-holder slide 2 linearly, by virtue of the screw threads 2a and 3a. This has the effect of changing the relative position between the dish 7 and the grinding block 5, which changes the grinding of the condiment. Because the operating ring 3 is mechanically driven by the lugs 3e, this eliminates the need for an adhesive, which can sometimes cause problems in use depending on the type of material used.

The universal cassette which is described above can also be used in electric mills. The principle is the same as the foregoing, although there are a few structural differences related to the parts of the mill. As previously, the dish-holder slide 2 moves vertically without rotating, which facilitates the adaptation of a light. The fixing disk 1 is attached to the mill body by adhesive bonding, and is received in a housing 1e designed for the passage of a peg.

The foregoing universal cassette is designed, in particular, for mills with a body having a minimum diameter of 54 millimeters. For diameters of a greater size, an adapter ring can be added or made directly as part of the mill. If the diameter of the mill is smaller, the universal cassette of the present invention cannot allow the passage of a light-holder tube.

Although indexing notches are provided to allow a user to quickly find a certain degree of fineness adjustment, all intermediate positions are possible, without the risk of accidental slippage of the setting.

Although the universal cassette of the present invention has been described in terms of particular embodiments, the universal cassette of the present invention comprises all technical equivalents of the means described.

The invention claimed is:

1. A universal device for adjusting an apparatus for grinding a condiment or breaking up foodstuff, wherein the universal device comprises a cassette having a rotatable adjustment ring, a dish-holder slide coupled with the adjustment ring, and a fixing disk coupled with the dish-holder slide for placement on body portions of the apparatus, wherein rotation of the adjustment ring moves the dish-holder slide axially, and wherein the dish-holder slide moves the fixing disk.

2. The universal adjustment device of claim 1 which further includes a ferrule, wherein the ferrule couples the device with all types of mechanical or electric apparatus for grinding a condiment or breaking up foodstuff.

3. The universal adjustment device of claim 1 wherein the adjustment ring has an internal screw thread and the dish-holder slide has an external screw thread corresponding to the internal screw thread of the adjustment ring, for axially moving the dish-holder slide.

4. The universal adjustment device of claim 3 wherein the external screw thread of the dish-holder slide has an interruption at a defined location.

5. The universal adjustment device of claim 1 wherein the adjustment device is attachable to the body portions of the apparatus by the fixing disk.

6. The universal adjustment device of claim 1 wherein the adjustment ring has a movable stop having an indexing finger.

7. The universal adjustment device of claim 6 wherein the indexing finger of the movable stop is positioned in notches in the dish-holder slide.

8. The universal adjustment device of claim 6 wherein the movable stop has a central opening, for providing the movable stop with flexibility.

9. The universal adjustment device of claim 1 wherein the fixing disk includes a bridge for connection to an operating shaft of a grinding block.

10. The universal adjustment device of claim 1 wherein the dish-holder slide has two bosses, wherein the fixing disk has two housings, and wherein the bosses on the dish-holder slide are inserted in the housings on the fixing disk, connecting the fixing disk and the dish-holder slide.

11. The universal adjustment device of claim 1 wherein the dish-holder slide has a stop for limiting movement of the adjustment ring.

12. The universal adjustment device of claim 1 wherein the dish-holder slide has a central projection for preventing products from entering the apparatus.

13. The universal adjustment device of claim 1 wherein the adjustment ring and the fixing disk are clipped together.

14. The universal adjustment device of claim 1 wherein the adjustment ring has lugs for mechanically driving the ring.

15. An apparatus for grinding a condiment or breaking up foodstuff, in combination with the cassette of any one of claims 1 to 14, coupled with the body of the apparatus.

16. The apparatus of claim 15 wherein the cassette is coupled with the apparatus by a ferrule.

* * * * *